Patented Oct. 27, 1953

2,657,148

UNITED STATES PATENT OFFICE 2,657,148

NEW AND IMPROVED SOLUTIONS OF ZEIN AND METHOD OF MAKING SAME

Joseph R. Ehrlich, New York, N. Y.

No Drawing. Application July 9, 1947,
Serial No. 759,904

6 Claims. (Cl. 106—153)

1

My invention relates to new and improved solvents for prolamins, new and improved solutions of prolamins, and new and improved methods of making such solution.

The prolamins or alcohol-soluble proteins are exemplified by zein. These prolamins are disclosed in Hansen U. S. Patent No. 2,115,717, dated May 3, 1938.

The solutions of zein later referred to herein are clear and have the properties of clear solutions. It is the consensus of opinion in this field that such solutions are colloidal dispersions of the zein, which is very finely dispersed or peptized, and that the solvents are dispersing or peptizing agents for the zein.

The solvents for zein which have hitherto been used, are classified as follows:

1. Single or primary solvents which dissolve zein to make primary solutions, without the addition of water or auxiliary organic solvent to the primary solvent. Many such primary solvents are disclosed in Industrial and Engineering Chemistry, November 1941, pages 1416–1417. As stated in this publication, the primary solvents for zein include hydroxy compounds, amines, amides, and acids, and the stability of zein in such primary or single solvents is much better than in binary solvents which contain water.

This publication also defines "critical peptization temperature" as the temperature at which the prolamin is dispersible in the solvent in all proportions. Below said critical peptization temperature, the prolamin is dispersible in the solvent in only small proportion.

2. Binary solvents which include water. Neither ingredient of a binary solvent is necessarily a solvent for zein, when used alone. Many such binary solvents are disclosed in Industrial and Engineering Chemistry, February 1943, pages 230–232, and also in the issue of June 1943, pages 661–665.

3. Water-free binary solvents, in which neither component is a solvent for zein, when used alone.

4. Ternary and other multiple solvents, in which one component may be water, or in which all the components are organic compounds. Many ternary solvents are described in Industrial and Engineering Chemistry, May 1944, pages 408–410.

When water has heretofore been used in sub-

2 stantial proportion in a zein solvent, the water has heretofore been thus used as an ingredient of a binary solvent or other multiple solvent.

Thus, Coleman U. S. Patent No. 2,246,779, dated June 29, 1941, discloses the use of substantially non-aqueous alcohols, which have a maximum of 5% of water, plus the use of an acid component. It is stated that if water is added to the solution, the amount of added water should not, in general, materially exceed 5%, so that for practical purposes, the coating compositions of this Coleman patent are substantially non-aqueous. With respect to the proportion of water, the same disclosure is found in Coleman U. S. Patents No. 2,298,548 and No. 2,298,549, both dated October 13, 1942.

It has been the opinion in this field that the addition of water to a primary prolamine solution lowered or destroyed its stability, as stated in Industrial and Engineering Chemistry, February 1943, pages 230–232, which recommends the use of anhydrous solvents and other precautions to prevent gelation. The addition of water to primary solutions has been avoided, because in all or at least in many cases, such addition produced immediate coagulation.

For many purposes, it is desirable to include more than 5% of water in a solution of zein in a single or primary solvent, if such primary solution can be made stable. This applies particularly to non-volatile primary solvents, which have no substantial evaporation at ordinary room temperature of substantially 21° C., under standard pressure of 760 mm. of mercury.

Solutions of zein in various primary non-volatile solvents, as in many glycols, triethanolamine, etc., are viscous in commercial concentrations. Such primary solutions have poor penetration, so that they cannot be used commercially as impregnating materials. They have poor spreading properties at ordinary room temperature of substantially 21° C., and they are expensive. If such primary solutions are diluted with volatile or non-volatile organic thinners, the cost is not greatly decreased, and the use of such thinners is often undesirable. By diluting such primary solutions with a substantial proportion of water, in excess of 5%, especially if a suitable glycol is used as the primary solvent, the solution is fluid and it has good penetration and it is easily spread, even at high concentration of dissolved zein. Such water-containing primary solutions produce plasticized zein films or layers of increased strength. When water is present in substantial proportion during the cure of the zein, the curing is accelerated and the strength and resistance of the cured zein are increased. The presence of a substantial proportion of water in the primary solution enables the addition of aqueous curing agents without causing coagulation. As one example of such aqueous curing agent, I refer to technical glyoxal, which is a solution of glyoxal in water. Glyoxal is further identified as ethanediol, CHOCHO.

It has been proposed to make zein solutions or dispersions in aqueous glycerine or in aqueous diethylene glycol, by using various auxiliary emulsifying or dispersing agents, such as certain metal resinates, certain metal soaps, and certain organic ammonium compounds However, such dispersions are very unstable, so that the zein rapidly separates at ordinary room temperature of substantially 21° C.

I have discovered several new methods of producing stable and clear solutions of zein in a primary solvent, even though such solutions contain a substantial percentage of water, in excess of 5%. When I refer to a stable solution, I designate a solution which does not separate by sedimentation or coagulation, or by separation upon standing into two layers of different viscosity, and which does not gelate without separation, at room temperature of substantially 21° C., during a storage period of six weeks. I have stored the improved solutions as long as eight months without thickening. Due to variations in the zein and the composition of the solution, a respective solution may thicken during storage. In such case, slight agitation without heat restores the desired non-thickening fluidity for another substantial period. Such solutions are also defined as "stable," for the purposes of my invention. I prefer to use non-volatile primary solvents, as previously defined, as exemplified by various glycols. When I refer to a substantial proportion of water, I refer to a solution which has at least 8%–10% of water, preferably at least 10%, calculated upon the entire weight of the zein solution.

According to one improved method, I add water very slowly and carefully, using constant and vigorous agitation, to a primary solution of zein, in which the primary solvent has water tolerance. This is wholly contrary to prior theory and practice.

As one example, I dissolve 20 parts of zein in 80 parts of propylene glycol, $CH_3CHOHCH_2OH$, under suitable agitation. All proportions stated in this description are by weight. I heat this solution to 60° C., and I add 15 parts of water, at the rate of substantially one part of water per minute. Such rate may be 0.5 part of water per minute, or even less, if a large batch is made. The water is thus added uniformly, under constant and vigorous agitation.

The water which is thus added may be at 60° C., so that the solution is maintained at 60° C. during the addition of the water.

I prefer to cool said original zein solution from 60° C. to substantially 21° C., and then to add the water at substantially 21° C.

As another example, I can dissolve 20 parts of commercial zein in 55 parts of dipropylene glycol, $(CH_3CHOHCH_2)_2O$, and add 25 parts of water to the resultant primary solution, using either of the above mentioned procedures.

I have also discovered that relatively small amounts of organic hydroxy acids and their derivatives such as their salts, esters or ethers, produce and/or greatly increase the water tolerance of primary zein solvents. Certain carboxylic acids and said derivatives, and also boric acid, can be used for the same purpose.

As examples of such hydroxy acids and their derivates, I refer to hydroxyacetic acid or glycolic acid, lactate acid, citric acid, salicyclic acid, sodium salicylate, the acetic ester of salicyclic acid, ethyl lactate, etc.

Coleman U. S. Patent No. 2,246,779, of January 24, 1941, discloses solutions of zein in 95% ethanol or methanol, and also in certain unspecified anhydrous glycols and other alcohols. It is well known that anhydrous ethanol and methanol do not dissolve zein at 21° C., so that 95% ethanol and methanol are classified as binary solvents. I have discovered that by making a solution of zein in a primary anhydrous solvent with the use of such acids, I can incorporate a substantial percentage of water into such anhydrous primary solution, such as 8%–10% of water, or more, preferably at least 10% of water, while securing a stable solution.

Coleman U. S. Patent No. 2,298,548, dated October 13, 1942, discloses the use of boric acid, but only in a solution which has a maximum of 5% of water. The same applies to Coleman U. S. Patent No. 2,298,549, dated October 13, 1942. A primary solvent of the type described in the Coleman patents is designated as being substantially anhydrous, when it has a maximum of 5% of water.

As other examples of carboxylic acids, I refer to the caproic acid and butyric acid.

I have also discovered that the addition of relatively small amounts of hydroxy acids or their derivatives, or of certain carboxylic acids, or of boric acid, cause non-solvents of zein to become primary solvents of zein, even with water tolerance.

I have also discovered that in a binary solvent of zein, in which water is one ingredient and the other ingredient, when used singly, is a non-solvent of zein, a certain minimum proportion of water is necessary to produce a binary solvent. This minimum proportion of water varies with the respective other ingredient. I have discovered that by using said acids and said derivatives, I can considerably reduce the minimum proportion of water in such binary solvent, thus improving the stability of the zein solution.

I have also descovered that certain non-solvents of zein require the addition of water plus hydroxy acid, in order to produce a zein solvent.

The aforesaid acids and derivatives exert the desired action, even if they are not singly primary solvents for zein.

Some hydroxy acids are solvents for zein, when used singly. Thus, pure lactic acid dissolves zein at 90° C.–120° C. This produces a clear solution, which can be diluted with 30–40 parts of water, without turbidity. The addition of more water changes the solution to a hazy liquid, which indicates the beginning of the sedimentation of the zein.

An aqueous 80% solution of citric acid dissolves zein at substantially 100° C. The addition of a small proportion of water precipitates the zein.

However, the addition of even a small proportion of citric acid to a glycol solution of zein, makes this solution stable when a substantial proportion of water is added.

A hot aqueous solution of salicylic acid does not dissolve zein.

A 70% aqueous solution of glycolic acid easily dissolves zein, and such solution remains stable when substantially diluted with water.

I have also discovered that I can use liquids which singly are non-solvents for zein, said liquids being miscible with polar liquids and also with non-polar liquids. Such non-solvents, which are miscible with polar liquids and non-polar liquids, are exemplified by hexylene glycol, also designated as 2-methyl, 2-4-dihydroxypentane or 2-methyl, 2-4-pentanediol. This compound is described at page 423 of Standard Chemical and Technical Dictionary, 1939, published by The Chemical Publishing Company, Inc., as having the formula,

(CH$_3$)$_2$COHCH$_2$CHOHCH$_3$

Water is a typical polar liquid and benzene is a typical non-polar liquid.

Hexylene glycol is easily miscible with water and with benzene.

Hexylene glycol, when used singly at 21° C., is not a solvent for zein.

In order to make a composition which has 20 parts of dissolved zein, with the use of 80 parts of hexylene glycol as one ingredient of a water-containing binary solvent, I must use a minimum of 36.4 parts of water, so that the total composition has 136.4 parts, and it has 26.7% of water.

A binary solvent of hexylene glycol and water, must contain at least 31.2% of water and 68.8% of hexylene glycol in order to dissolve 20 parts of zein. Thus, in the above example, the 80 parts of hexylene glycol and the 36.4 parts of water make a total of 116.4 parts, of which the water constitutes 31.2%. When a binary solvent of hexylene glycol and water is used to dissolve 20 parts of zein, calculated upon the weight of such binary solvent, the maximum limit of water is 54.2% of the weight of said binary solvent.

If 20 parts of zein are dissolved in a mixture of 80 parts of hexylene glycol and 36.4 parts of water, the water is 26.7% of the entire solution. In such case, the maximum proportion of the water is 48.5% of the entire solution.

Below said minimum of 26.7% and above said maximum of 48.5%, a 20% solution of zein separates at room temperature of substantially 21° C.

Most water-containing binary solvents for zein, in which the other ingredient is singly a non-solvent for zein, have the same property, namely, they require a proportion of water between a certain minimum percentage and a certain maximum percentage, in order to make a 20% solution of zein which is stable for a substantial period as six weeks or more, at substantially 21° C.

Instead of using pure water in the above example, water can be used which is intermixed with 5% of an aqueous solution of hydroxyacetic acid, said aqueous solution having 70% of hydroxy acetic acid.

Said 5% of said 70% solution replaces 5% of the water.

In such case, the lower limit of the water which contains the dissolved hydroxyacetic acid is lowered from 26.7% to 21.2% and its upper limit is raised from 48.5% to 52.5%, calculated upon the entire solution. In the lower limit of 21.2%, the water ingredient has 13.46% of dissolved hydroxyacetic acid, calculated upon the weight of the water ingredient. In the upper limit of 52.5%, the water ingredient has 3.1% of dissolved hydroxyacetic acid, calculated upon the weight of the water ingredient.

I have also discovered that primary solvents for zein, which are miscible with water to make a binary solvent, have increased water tolerance if hydroxy acids, such as hydroxyacetic acid and other carboxylic acids and boric acid, are dissolved in said water ingredient.

A binary solvent of hexylene glycol and water, preferably with added lactic acid or the like, produces a stable solution of zein at 21° C., and I therefore can use this mixed solvent for extracting zein. Such mixed solvent alone evaporates too readily for making a solution of zein which is to be fast cured, because in such case, I lose too much of the hexylene glycol by evaporation at a fast curing temperature of 150° C. or more, even though the boiling point of hexylene glycol is above 170° C.

As another example, I mix five parts of salicylic acid, 20 parts of zein and 75 parts of hexylene glycol. These proportions are by weight. In this mixture, the zein and the salicylic acid are not dissolved in the hexylene glycol. I add 16 parts by weight of water to this mixture, as at 40° C.–50° C., and I cool the mixture to 21° C. This produces a stable solution of zein. The weight of the salicylic acid is 31% of the weight of the water. This solution is not stable for fast curing of the zein at high temperature.

I prefer to use primary solvents which have a critical peptization temperature of −40° C. or below.

Some of these primary solvents are as follows:

TABLE NO. 1

1. Benzyl "cellosolve" (ethylene glycol monobenzyl ether, C$_6$H$_5$CH$_2$OC$_2$H$_4$OH)
2. Butylamine
3. Butyl tartrate
4. Diethylene glycol, namely,

CH$_2$OHCH$_2$OCH$_2$CH$_2$OH

5. "Carbitol," namely, diethylene glycol monoethyl ether, CH$_2$OHCH$_2$OCH$_2$CH$_2$OC$_2$H$_5$
6. Methyl "carbitol" (diethylene glycol monomethyl ether, CH$_3$OCH$_2$CH$_2$OCH$_2$CH$_2$OH)
7. Diethylene triamine, NH$_2$C$_2$H$_4$NHC$_2$H$_4$NH$_2$
8. Diglycol chlorohydrin, ClCH$_2$CH$_2$OCH$_2$OH$_2$OH
9. Dipropylene glycol (CH$_3$OHOHCH$_2$)$_2$O
10. Methylene chlorohydrate
11. "Cellosolve," namely, ethylene glycol monoethyl ether, CH$_2$OHCH$_2$OC$_2$H$_5$
12. Propylene diamine NH$_2$CHCH$_3$CH$_2$NH$_2$
13. Propylene glycol, CH$_3$CHOHCH$_2$OH
14. Triethylene tetramine

NH$_2$(C$_2$H$_4$NH)$_2$C$_2$H$_4$NH$_2$

15. Triethylene glycol HOC$_2$H$_4$OC$_2$H$_4$OC$_2$H$_4$OH
16. Polyethylene glycol, which is a polymer of ethylene glycol, having a molecular weight of at least 300
17. Polypropylene glycol, which is a similar polymer of propylene glycol According to prior practice, it has been known that primary zein solutions in primary solvents coagulate immediately if water is added, so that they have poor tolerance for water, unless the primary solvent is an acid, or an amine which has an alkaline reaction, or unless said primary solvent is easily miscible with polar and non-polar liquids.

I have discovered that certain primary zein solutions in substantially anhydrous primary solvents, which do not belong to said three groups, exhibit substantial water tolerance when treated or supplemented as stated herein. I can thus produce stable solutions which contain at least 10% of water. While the distinction between polar and non-polar liquids is not sharp, polar liquids have a high dielectric constant, and they usually have polar groups, such as —OH, —NO₂, —CCOH, —NH₂, etc. As previously stated, water is an example of a polar liquid and benzol is an example of a non-polar liquid. However, by adding water slowly, as above stated, to solutions of zein which ordinarily cannot tolerate water, I can add substantial amounts of water to such solutions.

The importance of a critical peptization temperature whose maximum is —40° C. is illustrated by the fact that it is impossible to add water to a solution of zein in ethylene glycol, even according to my improved methods. The critical peptization temperature of ethylene glycol is plus 18° C.

In the tests stated below, I have used commercial zein, which had an average water content of 5%. These tests were carried out with 20% zein solutions, at about 21° C., in an atmosphere of air which had a humidity of 45%–70%. The solvents were chemically pure, but they were not specially dried so as to make them anhydrous.

Zein can absorb water up to about 7% of the weight of the zein. In the examples herein, the weight of the water in the final solution is greatly in excess of the adsorption limit of the dissolved zein for water.

In testing water tolerance, I have started with a 20% by weight solution of zein in the respective non-aqueous primary solvent. I then added water at 21° C., in small quantities and with continuous and vigorous agitation, until the solution became unclear. I then calculated the percentage of the water upon the weight of the entire aqueous mixture, as the percentage of water tolerance. As a further test, I added water up to a little less than the average water tolerance and I observed the stability of the aqueous mixture during a period of time. If the solution became unstable, I lowered my figure of maximum water tolerance.

These tests are stated as follows:

TABLE NO. 2

| Solvent | Maximum Water Tolerance, percent |
| --- | --- |
| 1. ethylene glycol | none |
| 2. diethylene glycol | 5 |
| 3. triethylene glycol | 11.5 |
| 4. polyethylene glycol | 14.1 |
| 5. propylene glycol | 18.7 |
| 6. dipropylene glycol | 28.8 |
| 7. polypropylene glycol | 30.3 |

Zein is soluble in ethylene glycol, but such solution is stable only for 24–48 hours at 21° C., and such solution becomes unstable upon the addition of any water, so that coagulation occurs immediately. This illustrates the importance of a critical peptization temperature whose maximum is minus 40° C.

The solution of zein in diethylene glycol is stable at 21° C. for a period up to about two years. If water is added to this solution, its stability becomes uncertain when the weight of the water approaches 5% of the weight of the solution, which contains 20% by weight of zein. If said solution contains more than 5% of water, separation occurs immediately. The critical peptization temperature of this diethylene glycol solution without water is minus 40° C. or less.

Diethylene glycol is not miscible with most non-polar liquids. Thus, it is immiscible with benzene, toluene, and carbon tetrachloride, which are representative non-polar liquids. A solution of zein in diethylene glycol, which contains a small proportion of water, has no advantage over a solution of zein in diethylene glycol alone. However, even in such case, I claim the method whereby water is added slowly, with constant and vigorous mixing. As later stated herein, I can increase the water tolerance up to 15% by weight of the entire 20% solution of zein, and I claim such solution.

Triethylene glycol is a primary solvent which is immiscible with representative non-polar liquids, such as benzene, toluene and gasoline. A 20% solution of zein in triethylene glycol, which contains about 10% by weight of water, calculated upon the weight of the entire solution, is of limited stability, up to about 12 days, so that such solution does not conform to the previously-mentioned definition of stability. However, I claim such solution, in which the solution remains self-stabilized when water is added slowly, with constant and vigorous mixing.

In general, the invention is not limited to a 20% solution of zein, as this proportion is merely an illustration, and the proportion of water tolerance may vary as the proportion of zein is varied.

The propylene glycol and dipropylene glycol and polypropylene glycol are miscible in limited proportions with many non-polar liquids, such as benzene.

The percentage of water which can thus be added, is also related to the period during which the solution of the zein in the respective solvent remains stable. Thus, a 20% solution of zein in ethylene glycol usually gels within 24 hours. Similar solutions in diethylene glycol and in propylene glycol remain liquid for respective periods of 5–6 months and about two years. These figures vary with the particular batch of zein and atmospheric conditions. The above tests were made with the same batch of commercial zein, and other conditions were identical. For best water tolerance, I prefer to use glycols, which have a straight chain of three carbon atoms without side chains, or which have a straight chain which is a multiple of three carbon atoms, also without side chains.

Other figures for water tolerance for primary solvents, when the water is added to a 20% zein solution according to my improved methods, are as follows:

TABLE NO. 3

| Primary Solvent | Water Tolerance, percent |
| --- | --- |
| 1. tetrahydrofurfuryl alcohol, $C_4H_7OCH_2OH$ | 40.8 |
| 2. Allyl alcohol $CH_2CHCH_2OH$ | 8.0 |
| 3. "Carbitol" | 33.3 |
| 4. "Cellosolve" | 45.0 |
| 5. methyl "Carbitol" | 26.0 |
| 6. methyl "Cellosolve," $CH_3OCH_2CH_2OH$ | 21.8 |
| 7. benzyl "Cellosolve," $C_6H_5CH_2OC_2H_4OH$ | 16.6 |
| 8. ethyl lactate | 49.7 |
| 9. pyridine | 63.0 |

In addition to ethylene glycol, other primary solvents for zein which have no water tolerance, are caproic acid, benzyl alcohol, "Santicizer No. 8," which is a mixture of ortho and paratoluene ethyl sulfonamides, and "Nevillac" Nos. ZC, TS, and 10°.

The following tables illustrate the effect of hydroxy acids or their derivatives, in increasing the water tolerance of 20% zein solutions.

TABLE NO. 4

| Primary Solvent | Maximum Water Tolerance without hydroxy acid | Maximum Water Tolerance containing 3.5% hydroxyacetic acid |
|---|---|---|
| | Percent | Percent |
| Ethylene glycol | none | 15 |
| Diethylene glycol | 5 | 15 |
| Triethylene glycol | 11.5 | 15 |
| Polyethylene glycol | 14.1 | 18 |
| Propylene glycol | 18.7 | 25 |
| Dipropylene glycol | 28.8 | 33.8 |
| Tetrahydrofurfuryl alcohol | 40.8 | 52.5 |
| Methyl Carbitol | 26.0 | 30.6 |
| Methyl Cellosolve | 21.8 | 33.0 |

TABLE NO. 5

| Primary Solvent | 5% of Acid Used | Maximum Water Tolerance | Maximum Water Tolerance Without Hydroxy Acid |
|---|---|---|---|
| | | Percent | Percent |
| Diethylene glycol | Salicylic acid | 15.2 | 5 |
| Do | Citric acid | 17.3 | 5 |
| Do | Lactic acid | 20.6 | 5 |
| Do | Tartaric acid | 18.7 | 5 |
| Do | Succinic acid | 16.6 | 5 |
| Propylene glycol | Citric acid | 25.9 | 18.7 |
| Do | Lactic acid | 26.5 | 18.7 |
| Do | Tartaric acid | 27.5 | 18.7 |
| Do | Succinic acid | 23.7 | 18.7 |

These zein solutions with hydroxy acid exhibit highly increased stability at room temperature of 21° C., and even at 0° C. They are clear solutions, do not separate and do not gel at 21° C. Their stability against gelation at 50° C. is also excellent.

Certain illustrative formulas which illustrate the use of carboxylic acids are as follows:

*Formula No. 1*

|  | Per cent |
|---|---|
| Zein | 22 |
| Diethylene glycol | 58 |
| Caproic acid | 5 |
| Water | 15 |

*Formula No. 2*

|  | Per cent |
|---|---|
| Zein | 22 |
| Diethylene glycol | 58 |
| Butyric acid | 5 |
| Water | 15 |

The following table illustrates the action of other carboxylic acids:

TABLE NO. 6

| Solvent | 5% Acid | Maximum Water Tolerance with 5% Acid | Maximum Water Tolerance without Acid |
|---|---|---|---|
| | | Percent | Percent |
| diethylene glycol | glacial acetic acid | 20.6 | 5 |
| Do | formic acid | 18.7 | 5 |
| Do | boric acid | 14.5 | 5 |

The following table gives examples of non-solvents for zein, which become solvents, when supplemented with hydroxy acids, including boric acid, and carboxylic acids:

TABLE NO. 7

| Non-solvents which become solvents with addition of acid | Acid |
|---|---|
| Dibutyl tartrate | Salicylic acid. |
| Acetone | Do. |
| Hexylene glycol | Do. |
| Diacetone alcohol | Lactic acid. |
| Dibutyl tartrate | Do. |
| Hexylene glycol | Do. |
| Water free methyl alcohol | Hydroxyacetic acid. |
| Water free ethyl alcohol | Do. |
| Secondary butyl alcohol | Do. |
| 2-ethyl hexane diol-1,3 | Do. |
| Mesityl oxide | Do. |
| Methyl ethyl ketone | Do. |
| Pentane dione | Do. |
| "Soliol Base" sulfonated mineral oil | Do. |
| Secondary butyl alcohol | Glacial acetic acid. |
| Do | Formic acid. |

All of the above-mentioned mixed solvents show water tolerance, except dibutyl tartrate when used jointly with salicylic acid. The non-polar dibutyl tartrate becomes a primary solvent for zein by the addition of small amounts (3%–5%) of salicylic acid or boric acid. This is one of the rare examples when zein can be dissolved in a non-polar solvent, such as dibutyl tartrate. The Nevillacs, later mentioned herein, and Santicizer No. 8 are examples of non-polar solvents for zein, which, however, are true primary solvents.

Beyond a certain minimum proportion of hydroxy acid, as a proportion of substantially 3% calculated upon the weight of the entire composition, an increase in the proportion of hydroxy acid does not substantially increase the maximum water tolerance.

Thus, if the solvent is hexylene glycol, its maximum water tolerance in the absence of hydroxy acid is 48.5%. When used conjointly with 5% of glycolic acid, the maximum water tolerance is increased to 52.5%, and this maximum water tolerance is not increased when the proportion of glycolic acid is increased to 10%.

Similarly, if the solvent is diacetone, the maximum water tolerance in the absence of hydroxy acid is 41.5%, and this is increased to 49.7% with the conjoint use of 5% of citric acid, and such maximum tolerance drops to 45.3% with the conjoint use of 15% of citric acid. In such case, the percentage of the supplemental acid or the like is calculated upon the entire zein composition, including the zein of said composition.

However, if a binary solvent is made with water and another organic ingredient which singly is not a solvent of zein, the minimum amount of water which is required in said binary solvent, is inversely proportional to the amount of supplemental acid or the like.

Thus, to make a binary solution of zein in a binary solvent which consists of hexylene glycol and water, in the absence of acid, it is necessary that the water should be 31.2% of the total solvent or 26.7% of binary solution. In the presence of a hydroxy acid the water contents of above binary solvent can be reduced. Although salicylic acid is not substantially soluble in water at room temperature or slightly higher, and is also not completely soluble in hexylene glycol, the presence of 3 parts of salicylic acid reduces the water contents of the binary solution of zein to 20 parts. The 3 parts of salicylic acid are completely dissolved in the final zein solution. If 5 parts of salicylic acid are present, the water contents of the binary solution can be reduced to 13.8% and if 10 parts of salicylic acid are present the water contents of the final binary solution is further reduced to 9.1%. If 15 parts of salicylic acid are present zein and the salicyclic acid can be dissolved in hexylene glycol without the addition of water.

Similarly in the presence of 5 parts of glacial acetic acid the minimum amount of water necessary in the binary solution is 16% and in the presence of 10 parts of glacial acetic acid is 11% of water.

Or, in order to produce a binary solvent for zein, 75.76 parts of hexylene glycol will have to be intermixed with 24.24 parts of a 20.8% aqueous acetic acid solution. Similarly 75.8 parts of hexylene glycol should be mixed with 24.2 parts of a 44.7% aqueous solution of acetic acid.

Diacetone is another example of a non-solvent for zein, when used singly. In order to produce a binary diacetone water solvent, the minimum proportion of water is 14.5% of the entire binary solution. But in the presence of 5 parts of citric acid the minimum water necessary to produce a binary solution of zein is reduced to 11.8% of the total binary solution. In the presence of 15% citric acid no water is necessary to dissolve the zein in diacetone. A 15% solution of citric acid in commercial diacetone can make a 20% solution of zein.

Or, in order to produce a binary solvent for zein, 81.53 parts of diacetone should be mixed with 18.47 parts of a 29.4% aqueous solution of citric acid.

Certain compounds which are non-solvents for zein when used singly, become solvents only when used jointly with both water and hydroxy acid. As examples of such compounds, I refer to methyl "Cellosolve" acetate, $CH_3COOCH_2CH_2OCH_3$; "Cellosolve" acetate, $CH_3COOCH_2CH_2OC_2H_5$; and glycol diacetate or diacetin.

A binary solvent for zein can be made by adding water to a primary solvent for zein, but the quantity of water added must not be more than the maximum water tolerance of the respective zein solution. The water tolerance for a number of primary solvents has been stated earlier in this specification. This water tolerance can be increased by adding small amounts of hydroxy acids, including boric acid and carboxylic acids. Such binary solvents can be used for extracting zein or other prolamines directly from cereal meal. I prefer to use primary solvents for zein which have a critical peptization temperature of at least minus 40° C., and preferably those which have a straight chain of 3 carbons, or a multiple of 3 carbons, and no side chains.

A third method of making aqueous zein solutions is as follows:

I have found that a zein solution which contains a liquid which is miscible with polar as well as non-polar substances, mostly liquids, becomes highly compatible with water and also with aqueous solutions of other substances, even with aqueous solutions of mineral salts and with aqueous emulsions including aqueous emulsions of resins, oils and other non-polar substances. The presence of hydroxy acids or certain carboxylic acids or boric acid, improves the compatibility and improves the stability of these zein solutions. These acids are also helpful in these combinations in promoting a faster and better cure for the zein and in decreasing the necessary minimum amount of water in such combinations, if in certain cases the presence of water is necessary at all.

One of the best examples of a liquid that is miscible with polar or non-polar liquids is hexylene glycol or 2-methyl,2-,4-di-hydroxypentane (2-methyl,2-,4-pentane diol). Hexylene glycol, for instance, easily blends with benzol ($C_6H_6$) and water. The boiling point of hexylene glycol is 196° C. at a pressure of 760 mm. of mercury.

Hexylene glycol alone is not a solvent for zein. It requires the addition of 36.4 parts of water to dissolve 20 parts of zein in 80 parts of hexylene glycol. Hence, 26.7 parts of water is necessary to keep zein in hexylene glycol solution at room temperature of 21° C. A binary solvent which consists of hexylene glycol and water, must contain at least 31.2% of water and 68.8% of hexylene glycol, in order to dissolve 20% of zein. There is also a maximum limit of water for this binary solvent, namely, 54.2%. If a 20% hexylene glycol zein solution contains more than 48.5% water at room temperature the zein separates. In other words, zein forms a clear solution in hexylene glycol if not less than 26.7% of water and not more than 48.5% of water are present. Most binary solvents for zein show a similar behavior, namely, a lower and an upper limit of the water content, if the non-aqueous component of the binary solvent is not a primary solvent. In the presence of 5% of a 70% aqueous solution of hydroxyacetic acid, the limits of the water ratio in said hexylene glycol solution are extended to 21.2% and 52.5% respectively. In the presence of 5% salicylic acid the limits of the water ratio are 13.8% and 42.8%.

Another solvent which acts like hexylene glycol, with respect to its blending properties and its capacity of making a zein solution in a primary solvent or non-solvent compatible with water, is a tetrahydrofurfuryl alcohol which has a boiling point of 177° C.–178° C. at a pressure of 743 mm. of mercury. Contrary to hexylene glycol, tetrahydrofurfuryl alcohol is a primary solvent for zein. No water needs to be added to dissolve 20 parts of zein in 80 parts of tetrahydrofurfuryl alcohol, and as much as 85.5 parts of water can be added to such a solution. In other words, the tetrahydrofurfuryl alcohol-zein solution can tolerate a maximum of 46% of water. The presence of 3½% of hydroxyacetic acid increases this maximum water tolerance to 53.7% in the entire solution.

Other products which act like hexylene glycol, with respect to compatibility with water, are sulfonated mineral oils or rather petroleum sulfonates. They come normally in oil solutions, and products of this kind which I have tested are different grades of "Soliol" base and different grades of "Indoil." Soliol base is a solvent for zein if a minimum amount of 42.5% water is present. Maximum water tolerance is 53.7% which can be increased to 60.5% in the presence of 3½% of hydroxyacetic acid. "Indoil" products are described in Industrial and Engineering Chemistry, issue of September 1946, and in catalogues of Standard Oil Company (Indiana) as being a mixture of sodium sulfonate, mineral oil, water, sodium sulfate and sodium hydroxide, with a range of 36%–56% of sodium sulfonate, 13%–47% of mineral oil, 5%–29% of water, 1.8%–6% of sodium sulfate, and 0.2%–2.0% of sodium hydroxide. These products, which are petroleum sulfonates, are used by me to increase water tolerance.

The "Soliol" products are substantially the same as the "Indoil" products.

The following formulas further exemplify my invention. In said formulas, the proportions are by weight. The designation "polyethylene glycol 300" refers to the molecular weight of this compound. The designation "hydroxyacetic acid (70%)" refers to a 70% aqueous solution of hydroxyacetic acid.

*Formula No. 3*

| | Per cent |
|---|---|
| Zein | 20 |
| Diethylene glygol | 40 |
| Hexylene glycol | 20 |
| Water | 20 |

*Formula No. 4*

| | Per cent |
|---|---|
| Zein | 19 |
| Hexylene glycol | 20 |
| Polyethylene glycol 300 | 41 |
| Water | 20 |

*Formula No. 5*

| | Per cent |
|---|---|
| Zein | 24 |
| Hexylene glycol | 10 |
| Polyethylene glycol 300 | 56 |
| Water | 20 |

*Formula No. 6*

| | Per cent |
|---|---|
| Zein | 18 |
| Polyethylene glycol 300 | 32 |
| Hexylene glycol | 20 |
| Hydroxyacetic acid (70%) | 5 |
| Water | 25 |

*Formula No. 7*

| | Per cent |
|---|---|
| Zein | 18 |
| Polyethylene glycol 300 | 20 |
| Hexylene glycol | 25 |
| Hydroxyacetic acid (70%) | 5 |
| Water | 32 |

*Formula No. 8*

| | Per cent |
|---|---|
| Zein | 19 |
| Diethylene glycol | 36 |
| Hexylene glycol | 20 |
| Hydroxyacetic acid (70%) | 5 |
| Water | 20 |

*Formula No. 9*

| | Per cent |
|---|---|
| Zein | 18 |
| Diethylene glycol | 35 |
| Hexylene glycol | 10 |
| Tetrahydrofurfuryl alcohol | 8 |
| Hydroxyacetic acid (70%) | 5 |
| Water | 24 |

*Formula No. 10*

| | Per cent |
|---|---|
| Zein | 30 |
| Polyethylene glycol 300 | 30 |
| Propylene glycol | 10 |
| Hexylene glycol | 10 |
| Hydroxyacetic acid (70%) | 5 |
| Water | 15 |

*Formula No. 11*

| | Per cent |
|---|---|
| Zein | 18 |
| Ethylene glycol | 16 |
| Diethylene glycol | 31 |
| Hexylene glycol | 15 |
| Hydroxyacetic acid (70%) | 5 |
| Water | 15 |

*Formula No. 12*

| | Per cent |
|---|---|
| Zein | 18 |
| Diethylene glycol | 47 |
| Hexylene glycol | 15 |
| Hydroxyacetic acid (70%) | 5 |
| Water | 15 |

*Formula No. 13*

| | Per cent |
|---|---|
| Zein | 18 |
| Ethylene glycol | 23.5 |
| Diethylene glycol | 23.5 |
| Hexylene glycol | 15.0 |
| Hydroxyacetic acid (70%) | 5.0 |
| Water | 15.0 |

*Formula No. 14*

| | Per cent |
|---|---|
| Zein | 18 |
| Propylene gloycol | 30 |
| Polyethylene glycol 300 | 10 |
| Hexylene glycol | 12 |
| Hydroxyacetic acid (70%) | 5 |
| Water | 25 |

*Formula No. 15*

| | Per cent |
|---|---|
| Zein | 26 |
| Polyethylene glycol | 34 |
| Propylene glycol | 10 |
| Hexylene glycol | 10 |
| Hydroxyacetic acid (70%) | 5 |
| Water | 15 |

*Formula No. 16*

| | Per cent |
|---|---|
| Zein | 20 |
| Diethylene glycol | 40 |
| Tetrahydrofurfuryl alcohol | 20 |
| Water | 20 |

*Formula No. 17*

| | Per cent |
|---|---|
| Zein | 18 |
| Diethylene glycol | 27 |
| Hexylene glycol | 25 |
| Hydroxyacetic acid (70%) | 5 |
| Water | 25 |

*Formula No. 18*

| | Per cent |
|---|---|
| Zein | 20 |
| Diethylene glycol | 20 |
| Hexylene glycol | 25 |
| Hydroxyacetic acid (70%) | 5 |
| Water | 30 |

*Formula No. 19*

| | Per cent |
|---|---|
| Zein | 20 |
| Diethylene glycol | 25 |
| Hexylene glycol | 25 |
| Water | 30 |

*Formula No. 20*

| | Per cent |
|---|---|
| Zein | 26 |
| Hexylene glycol | 62 |
| Hydroxyacetic acid (70%) | 7 |
| Water | 5 |

*Formula No. 21*

| | Per cent |
|---|---|
| Zein | 20 |
| Nevillac TS | 25 |
| Hexylene glycol | 35 |
| Water | 20 |

Formula No. 22

| | Per cent |
|---|---|
| Zein | 35 |
| Hexylene glycol | 15 |
| Nevillac 10° | 17.5 |
| Diethylene glycol | 17.5 |
| Water | 15 |

Formula No. 23

| | Per cent |
|---|---|
| Zein | 19 |
| Nevillac 10° | 41 |
| Hexylene glycol | 20 |
| Water | 20 |

Formula No. 24

| | Per cent |
|---|---|
| Zein | 20 |
| Santicizer No. 8 | 25 |
| Hexylene glycol | 35 |
| Water | 20 |

Formula No. 25

| | Per cent |
|---|---|
| Zein | 20 |
| Diethylene glycol | 40 |
| Soliol base | 20 |
| Water | 20 |

Formula No. 26

| | Per cent |
|---|---|
| Zein | 19 |
| Polyethylene glycol 300 | 36 |
| Soliol base | 20 |
| Hydroxyacetic acid (70%) | 5 |
| Water | 20 |

Formula No. 27

| | Per cent |
|---|---|
| Zein | 18 |
| Soliol base | 36 |
| Glycerine | 20 |
| Water | 26 |

Formula No. 28

| | Per cent |
|---|---|
| Zein | 15 |
| Soliol base | 47.5 |
| Water | 37.5 |

Formula No. 29

| | Per cent |
|---|---|
| Zein | 20 |
| Diethylene glycol | 40 |
| Indoil "AA" | 20 |
| Water | 20 |

Formula No. 30

| | Per cent |
|---|---|
| Zein | 20 |
| Hexylene glycol | 28 |
| Hydroxyacetic acid (70%) | 5 |
| Magnesium chloride 6H₂O | 20 |
| Water | 27 |

Formula No. 31

| | Per cent |
|---|---|
| Zein | 20 |
| Hexylene glycol | 20 |
| Hydroxyacetic acid (70%) | 5 |
| Calcium chloride (anhyd.) | 25 |
| Water | 30 |

Formula No. 32

| | Per cent |
|---|---|
| Zein | 22 |
| Hexylene glycol | 33 |
| Hydroxyacetic acid (70%) | 5 |
| Water | 23 |
| Magnesium chloride 6H₂O | 15 |

Santicizer 8, a product of Monsanto Chemical Corporation, is a mixture of o- and p-toluene ethyl sulfonamide. Nevillac TS and 10° and ZC are products of the Neville Company. They are phenol-modified indene-coumarone polymers.

The "Nevillac" resins are described at page 1004 of Handbook of Plastics, by Simonds and Ellis, published in 1943 by D. Van Nostrand Company, Inc., as being phenol-indene-coumarone resins.

These "Nevillac" resins are also described at pages 302-303 of Handbook of Material Trade Names, by Zimmerman and Lavine, published in 1946 by Industrial Research Service. This book describes "Nevillac 10°" as light yellow, and having a melting point of 5° C.–15° C. These resins are described as being compatible with zein.

In a catalogue published by The Neville Company in 1945, "Nevillac 10°" is described as being a hydrindyl phenol derivative, which is obtained by the condensation of phenols with unsaturates of the coumarone-indene type. The designation "hydrindyl" designates the radical of indane, which is also designated as hydrindene.

As stated at page 543 of Organic Chemistry, by Fieser, published in 1944 by D. C. Heath & Co., the formula of hydrindene or indane is,

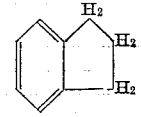

"Nevillac TS" is described at page 303 of Handbook of Material Trade Names as a plasticizer for zein, and as being a practically odorless, colorless, completely-aromatic plasticizing resin.

All these aqueous zein solutions of which the above mentioned formulas are only a few examples, are useful as impregnating, coating and binding compositions. All kinds of curing agents which are inactive at room temperature but able to generate formaldehyde or any other active aldehyde groups under heat, can be easily dispersed or dissolved in these zein solutions. Glyoxal, for instance, which comes in an aqueous solution, can be easily mixed with any of the zein solutions mentioned in this specification. Other curing agents which are especially adapted to be used together with these aqueous zein solutions are: Methyl "Cellosolve" formal, methyl "Cellosolve" acetal, methyl "Carbitol" formal. All these curing agents can remain inert in these zein solutions for many months at 20° C.–25° C., and they even contribute to the stability of these zein solutions. Some of them even act as plasticizers. The solvents with polar and non-polar compatibilities, which I use, have all relatively high boiling points. The minimum boiling point at a pressure of 760 mm. of mercury is 120° C.–160° C., or more, preferably 150° C. or higher. They are substantially non-volatile so that all, or a good part of them at least, remain in the plasticized zein composition after the cure. This cure is secured by heating to 120° C.–165° C. The presence of these solvents with polar and non-polar compatibilities makes it possible to combine non-polar synthetic resins or non-polar natural resins or non-polar plasticizers with zein and to incorporate, at the same time, polar plasticizers which normally would not be compatible with all those non-polar resins. Also the compatibility of non-polar and polar plasticizers which is thus produced, creates a new effect in the zein. These non-polar resins and plasticizers can be incorporated as a dispersion, emulsion or solution, or directly if a liquid. The dissolved zein encloses or occludes the uniformly distributed non-polar resin particles and, after the cure, an intimate uniform mixture is formed. The thermoplasticity and solubility of the non-polar resins in their respective solvents is reduced; on the other hand they impart some of their physical properties, such as flexibility, toughness, strength etc. to the cured zein. All the aqueous zein solutions previously mentioned, whether they contain hydroxy acids, carboxylic acids, boric acid and/or a polar and non-polar compatible compound, exhibit improved curing properties. They cure faster and more completely and at lower temperatures with formaldehyde than zein solutions which are free of water, or than alkaline zein dispersions.

Many of these aqueous zein solutions are excellent cork binders if they do not contain too much water. 15% to 20% of water in a zein solution which is used as a cork binder is a representative proportion. It is not necessary to cure a cork composition in which a zein solution is used as a binder, until all this water is driven off, because a good deal of this relatively small water content can be absorbed by the cork and remain partly in the cork and partly in the binder itself, thus providing a soft, flexible product. An example of a cork composition which can be used for closures for bottles or jars is the following:

*Formula No. 33*

A solution containing 18 parts of zein, 50 parts of propylene glycol, 10 parts of glycerine, 5 parts of citric acid, 17 parts of water and 8 parts of glyoxal, is thoroughly mixed with cork granules in a ratio of one part of said zein solution to 4.5 parts of cork per weight. The mixture is compressed in a mold to a desirable density or extruded by one of the usual extrusion machines used for the purpose and cured at a temperature of 130° C. for 20 minutes while under pressure.

*Formula No. 34*

Another example for the same purpose is the following:

| | Parts |
|---|---|
| Zein | 18 |
| Propylene glycol | 60 |
| Citric acid | 5 |
| Water | 17 |
| Glyoxal | 10 |

This zein solution binder is mixed with cork in the ratio of one part of said binder to 4.5 parts of cork, and compressed to a density of 20 lbs. per cu. ft. and cured for 20 minutes at 275° F.

*Formula No. 35*

As another example, using the same steps of mixing, compressing and curing, I can use

| | Parts |
|---|---|
| Zein | 18 |
| Soliol base | 36 |
| Glycerine | 20 |
| Water | 26 |
| Paraformaldehyde | 3 |

*Formula No. 36*

Composition cork that looks like a cork-rubber composition can be made in the following way:

| | Parts |
|---|---|
| Zein | 35 |
| Hexylene glycol | 15 |
| Nevillac 10° | 17.5 |
| Diethylene glycol | 17.5 |
| Water | 15 |
| Glyoxal | 10 |

Eight parts of binder are mixed with 10 parts of cork, compressed to a density of 20 lbs. per cu. ft. and cured for two hours at 140° C.

Another example is:

*Formula No. 37*

| | Parts |
|---|---|
| Zein | 30 |
| Polyethylene glycol 300 | 30 |
| Propylene glycol | 10 |
| Hexylene glycol | 10 |
| Hydroxyacetic acid (70%) | 5 |
| Water | 15 |
| Glyoxal | 7 |

One part binder is mixed with one part of a blend containing 50% granulated cork and 50% granulated rubber waste. The mixed composition is compressed into a mold to a density of 24 lbs. per cu. ft. and cured for 3 hours at 125° C.

The following examples illustrate cork compositions which might be used for gaskets, shoe parts and other general industrial application:

*Formula No. 38*

| | Parts |
|---|---|
| Zein | 18 |
| Ethylene glycol | 23.5 |
| Diethylene glycol | 23.5 |
| Hexylene glycol | 15 |
| Hydroxyacetic acid (70%) | 5 |
| Water | 15 |
| Glyoxal | 7 |

24 parts of this binder are mixed with 76 parts of fine granulated cork, compressed to a density of 23 lbs. per cu. ft. and cured at 140° C. for 75 minutes.

*Formula No. 39*

| | Parts |
|---|---|
| Zein | 20 |
| Diethylene glycol | 40 |
| Soliol base or Indoil "AA" | 20 |
| Water | 20 |
| Glyoxal | 10 |

This solution is mixed in a ratio of 1 part binder to 4 parts of cork granules, compressed to 19 lbs. per cu. ft. and cured for 1½ hours at 140° C.

*Formula No. 40*

| | Parts |
|---|---|
| Zein | 18 |
| Propylene glycol | 31 |
| Polyethylene glycol 300 | 16 |
| Hexylene glycol | 15 |
| Water | 15 |

24 parts of said binder are mixed with 76 parts of fine granulated cork and 2.4 parts glyoxal, compressed to 23 lbs. per cu. ft. and cured at 130° C.–135° C. for two hours.

*Formula No. 41*

| | Parts |
|---|---|
| Zein | 18 |
| Diethylene glycol | 47 |
| Hexylene glycol | 15 |
| Hydroxyacetic acid (70%) | 5 |
| Water | 15 |

This solution is mixed with glyoxal as in Formula No. 40, and the steps of Formula No. 40 are followed.

Formula No. 42

| | Parts |
|---|---|
| Zein | 22 |
| Hexylene glycol | 33 |
| Magnesium chloride 6H₂O | 15 |
| Hydroxyacetic acid (70%) | 5 |
| Water | 25 |

1 part of said binder, 4 parts of cork granules, $\frac{1}{10}$ part of glyoxal are mixed and compressed to 20 lbs. per cu. ft. and cured for 1 hour at 150° C.–160° C.

Formula No. 43

| | Parts |
|---|---|
| Zein | 22 |
| Polyethylene glycol 300 | 58 |
| Hydroxyacetic acid (70%) | 5 |
| Water | 15 |

1 part of said binder, $\frac{1}{10}$ part of glyoxal and 4 parts of cork granules are mixed, compressed to 19 lbs. per cu. ft. and cured at 150° C.–160° C. for 1 hour.

Formula No. 44

| | Parts |
|---|---|
| Zein | 19 |
| Polyethylene glycol 300 | 36 |
| Hexylene glycol | 20 |
| Hydroxyacetic acid (70%) | 5 |
| Water | 20 |

The procedure is as in Formula No. 43.

Formula No. 45

| | Parts |
|---|---|
| Zein | 18 |
| Polyethylene glycol 300 | 20 |
| Hexylene glycol | 15 |
| Tetrahydrofurfuryl alcohol | 10 |
| Hydroxyacetic acid | 5 |
| Water | 32 |

The procedure is the same as in Formula No. 43.

Formula No. 46

| | Parts |
|---|---|
| Zein | 15 |
| Polyethylene glycol 300 | 10 |
| Hexylene glycol | 20 |
| Hydroxyacetic acid (70%) | 5 |
| Polyvinyl acetate emulsion | 50 |

1 part of said binder, 2 parts of fine granulated cork, $\frac{1}{10}$ part of glyoxal are mixed, packed and compressed to 22 lbs. per cu. ft. and cured at 130° C.–140° C. The aqueous polyvinyl acetate emulsion has a solid content of 50% of polyvinyl acetate.

Formula No. 47

| | Parts |
|---|---|
| Zein | 13 |
| Polyethylene glycol 300 | 22 |
| Hexylene glycol | 20 |
| Hydroxyacetic acid (70%) | 5 |
| Polyvinyl acetate emulsion | 40 |

The procedure in water is the same as in Formula No. 46. The polyvinyl acetate is classified as a film-forming plastic.

Formula No. 48

| | Parts |
|---|---|
| Zein | 15 |
| Soliol base | 47.5 |
| Water | 37.5 |

1 part of said binder, ½ part of glyoxal, 4 parts of coarse cork granules are mixed and compressed to 20 lbs. per cu. ft. and cured at 150° C. for 1 hour.

The following formulas, Nos. 49, 50 and 51, can be used as cork binders and also for paper coatings:

Formula No. 49

| | Parts |
|---|---|
| Zein | 20 |
| Nevillac TS | 25 |
| Hexylene glycol | 35 |
| Water | 20 |
| Glyoxal | 10 |

Formula No. 50

| | Parts |
|---|---|
| Zein | 17 |
| Diethylene glycol | 13 |
| Hexylene glycol | 25 |
| RHoplex W66 | 20 |
| Hydroxyacetic acid (70%) | 5 |
| Water | 15 |
| Glyoxal | 10 |

RHoplex W66 is an aqueous dispersion of acrylate resin with 25% solid content, produced by Roehm and Haas.

Formula No. 51

| | Parts |
|---|---|
| Zein | 20 |
| Santicizer 8 | 25 |
| Hexylene glycol | 35 |
| Water | 20 |
| Glyoxal | 10 |

A paper coating can be made with the following solution:

Formula No. 52

| | Parts |
|---|---|
| Zein | 19 |
| Nevillac 10° | 41 |
| Hexylene glycol | 20 |
| Water | 20 |
| Glyoxal | 10 |

Formula No. 53

This formula, and also No. 54, can be used for impregnating paper:

| | Parts |
|---|---|
| Zein | 16 |
| Propylene glycol | 44 |
| Hydroxyacetic acid (70%) | 5 |
| Polyvinyl acetate emulsion | 35 |

Formula No. 54

| | Parts |
|---|---|
| Zein | 16 |
| Hexylene glycol | 20 |
| Nevillac 10° | 15 |
| Diethylene glycol | 24 |
| Water | 25 |
| Glyoxal | 10 |

This composition of Formula No. 54 may be used, for instance, as impregnating material for making paper gaskets. The glycols are useful to soften the paper fibers and the Nevillac 10° will increase the water resistance of the paper. The glycols and the Nevillac are zein plasticizers and will keep the zein plasticized when the impregnated paper comes into ocntact with water, gasoline, octane, benzoil, oil, etc.

Formula No. 55

Another impregnation liquid is the following:

| | Parts |
|---|---|
| Zein | 15 |
| Hexylene glycol | 25 |
| Diethylene glycol | 30 |
| Water | 30 |
| Glyoxal | 10 |

Composition cork made with zein solutions disclosed in this specification, exhibit improved tensile strength and improved resistance to the influence of moisture and heat. The drop of tensile strength of a cork sheet exposed for 24 hours to a temperature of 90° F. and a relative humidity of 90%, is much less than the drop of a similar sheet made under similar conditions with the use of an anhydrous primary zein solution. As an example of the drop, I mention the following figures: Tensile strength of cork sheet made with a binder containing 25 parts zein, 72 parts of diethylene glycol and 3 parts paraformaldehyde, cured at 300° F. for one hour, and aged at 80° C. for two hours, is 242 lbs. per sq. in. The tensile strength of the same sheet after exposure for 24 hours to a temperature of 90° F. and 90% relative humidity, is 162 lbs. per sq. in. A cork sheet made with the same quality of zein and the same density per cu. ft. as the above mentioned cork sheet, and containing the same amount of binder, but made with a binder which consists of 20 parts of zein, 35 parts of diethylene glycol, 20 parts of hexylene glycol and 5 parts of hydroxyacetic acid and 20 parts of water, shows in both tests, the following figures: 218 lbs. per sq. in. and 198, respectively. That means that the relative drop between the dry and the wet sheet is much less. The reason that the absolute tensile strength is lower is that the zein content of the binder is 20% instead of 25%. Zein is the only product responsible for the tensile strength in the binder. Therefore, the tensile strength of the second sheet is relatively even greater.

Many of the described and newly discovered solvents or solvent-mixtures are also useful in the extraction of zein and other prolamines from gluten, cornmeal etc. As described in this specification, many volatile or non-volatile non-solvents become solvents by adding hydroxy acids or boric acid or certain carboxylic acids. This may be useful in an extraction, where water is not desirable and the primary solvents, usually used for that purpose, cannot be used for some reason.

On the other hand, the presence of water is useful in extracting the prolamines with primary solvents, if high concentrations at low viscosity are required.

I prefer to use carboxylic acids which are members of the homologous series of fatty acids, and which have straight chains up to and including caproic acid, which has a straight chain of six carbon atoms. However, I do not limit my invention to these preferred acids. Boric acid is an example of an hydroxy acid.

Instead of using an aqueous emulsion of polyvinyl acetate, or methyl methacrylate, I can use aqueous emulsions of other film-forming materials. Depending upon the additional products, my solutions are neutral or acid or alkaline. The film-forming emulsion is neutral or alkaline or acid, corresponding to the respective condition of the zein solution. With the same limitation, I can use aqueous emulsions of the materials defined in Handbook of Plastics, by Simonds & Ellis, published in 1943, and other materials of the same class or classes.

I claim:

1. A method of making a mixture of water with a zein solution, which consists in dissolving the zein initially in a substantially anhydrous glycol which is a primary solvent for zein, said glycol being substantially non-volatile at 130° C. under a pressure of 760 mm. of mercury and having a critical peptization temperature whose maximum is minus 40° C. to make an initial substantially anhydrous solution which remains clear and stable at 21° C. for at least six weeks, and then adding water to said initial solution, the water being added sufficiently slowly and with sufficiently vigorous agitation to blend with said initial solution without precipitation of the zein, the weight of the added water being at least 10% of the weight of the mixture and being within the water tolerance of said primary solvent.

2. A method of making a mixture of water with a zein solution, which consists in forming an initial solution of the zein, said initial solution being substantially anhydrous, the liquid phase of said initial solution being substantially a glycol which is intermixed with another liquid, said glycol being a primary solvent for zein and being substantially non-volatile at 130° C. under a pressure of 760 mm. of mercury and having a critical peptization temperature whose maximum is minus 40° C., said other liquid being also substantially non-volatile at 130° C. under a pressure of 760 mm. of mercury, said other liquid being miscible with polar and non-polar liquids and having the property of increasing the water tolerance of said primary solvent, and then adding water to said initial solution at a sufficiently low rate and with sufficient agitation to prevent precipitation of the zein, the weight of the added water being in excess of 5% of the weight of said primary solvent and being at least substantially 10% of the weight of said mixture, the amount of the added water being within the increased water tolerance of said primary solvent.

3. A method according to claim 2, in which said other liquid is hexylene glycol.

4. A method according to claim 2, in which said other liquid is tetrahydrofurfuryl alcohol.

5. A mixture of water with a pre-formed solution of zein, said pre-formed solution being a substantially anhydrous primary solution of zein, the solvent of said pre-formed solution being a glycol primary solvent for zein which is substantially non-volatile at 130° C. under a pressure of 760 mm. of mercury and which has a critical peptization temperature whose maximum is minus 40° C., said pre-formed solution also including hexylene glycol, said included hexylene glycol having the property of increasing the tolerance of said pre-formed solution to added water, the weight of said added water being at least substantially 10% of the weight of said mixture and being less than the weight of said primary solvent and being in excess of 5% of the weight of the primary solvent, the maximum weight of the added water being within the increased water tolerance of said pre-formed solution, said mixture remaining clear and stable at 21° C. for at least six weeks, zein being soluble in said glycol primary solvent in the anhydrous form of said primary solvent to form a clear solution which remains stable at 21° C. for at least six weeks.

6. A solution of zein, the solvent of the zein in said solution being a glycol primary solvent for zein, the zein being soluble in said glycol primary solvent in the anhydrous form of said glycol solvent to form a clear solution which remains stable at 21° C. for at least six weeks, said glycol primary solvent being mixed with water and with hexylene glycol which is included in said solution, said glycol primary solvent and said hexylene glycol being substantially non-volatile at 130° C. under a pressure of 760 mm. of mercury, said glycol primary solvent having a critical peptization temperature whose maximum is minus 40° C., the liquid phase of said solution consisting substantialy wholly of said glycol primary solvent and water and said hexylene glycol, the proportion of said glycol primary solvent exceeding the respective proportions of said hexylene glycol and of the water, said hexylene glycol being miscible with polar and non-polar liquids and having the property of increasing the water tolerance of said glycol primary solvent, the weight of the water being at least 10% of the weight of said solution and being in excess of 5% of the weight of said glycol primary solvent, the amount of water being less than the increased water tolerance of the glycol primary solvent, said solution remaining clear and stable at 21° C. for at least six weeks.

JOSEPH R. EHRLICH.

References Cited in the file of this patent

UNITED STATES PATENTS

| Number | Name | Date |
|---|---|---|
| Re. 21,268 | Baxter | Nov. 21, 1939 |
| 2,115,716 | Hansen | May 3, 1938 |
| 2,246,779 | Coleman | June 24, 1941 |
| 2,250,040 | Sturken | July 22, 1941 |
| 2,298,548 | Coleman | Oct. 13, 1942 |
| 2,352,604 | Coleman | July 4, 1944 |
| 2,360,081 | Stewart | Oct. 10, 1944 |
| 2,433,029 | Coleman | Dec. 23, 1947 |

FOREIGN PATENTS

| Number | Country | Date |
|---|---|---|
| 492,654 | Great Britain | Sept. 19, 1938 |
| 492,657 | Great Britain | Sept. 19, 1938 |

OTHER REFERENCES

Industrial and Engineering Chemistry, March 1941, pp. 394–398.

Industrial and Engineering Chemistry, Nov. 1941, pp. 1416–1417.

Industrial and Engineering Chemistry, May 1944, pp. 408–410.